(12) United States Patent
Abhyankar et al.

(10) Patent No.: US 6,862,733 B1
(45) Date of Patent: *Mar. 1, 2005

(54) GENERIC METHOD FOR PROGRAMMATICALLY LOCATING AND EXECUTING ANY APPLICATION

(75) Inventors: Sunil Vasudeo Abhyankar, Rancho Santa Margarita, CA (US); Mark Jeffrey Tadman, Mission Viejo, CA (US); Linjun Zhou, Rowland Heights, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/195,928

(22) Filed: Nov. 19, 1998

(51) Int. Cl.[7] .................................................. G06F 9/00
(52) U.S. Cl. ...................................................... 719/310
(58) Field of Search ................................ 709/316, 310; 345/847, 835–839, 764, 762; 707/205, 200; 719/316, 310

(56) References Cited

U.S. PATENT DOCUMENTS

| | | | | |
|---|---|---|---|---|
| 5,475,817 A | * | 12/1995 | Waldo et al. ............... | 395/650 |
| 5,877,765 A | * | 3/1999 | Dickman et al. ........... | 345/738 |
| 5,892,946 A | * | 4/1999 | Woster et al. .............. | 395/680 |
| 5,933,599 A | * | 8/1999 | Nolan ........................ | 345/734 |
| 6,014,667 A | * | 1/2000 | Jenkins et al. ............. | 707/10 |
| 6,173,311 B1 | * | 1/2001 | Hassett et al. ............. | 709/202 |
| 6,639,615 B1 | * | 10/2003 | Majumdar et al. ......... | 345/839 |

OTHER PUBLICATIONS

M. Nilson, et al, A Framework for Caching in an Object-Oriented System, Sun Microsystems Laboratories, Inc., Oct. 1993.*

* cited by examiner

Primary Examiner—Sue Lao
(74) Attorney, Agent, or Firm—Nathan Cass; Mark T. Starr; Lise A. Rode

(57) ABSTRACT

A method in a computer system is disclosed for programmatically locating any file and building a shortcut for future reference to that file. First, a shortcut cache is created if one does not exist. Then, the shortcut cache is searched for a shortcut for the file. The shortcut contains the location and name of the file. If the shortcut name is not found, then the shortcut directory for the current user is located in the system registry, and it is searched for the shortcut name. If the shortcut name is still not found, the shortcut directory for all users is located in the system registry, and it is searched for the shortcut name. If the shortcut name is found then it is stored in the shortcut cache; and, the location and name of the file is returned to the requester.

6 Claims, 9 Drawing Sheets

GENERIC METHOD FOR PROGRAMMATICALLY LOCATING AND EXECUTING ANY APPLICATION

FIELD OF THE INVENTION

The present invention generally relates to a method and system for automating the location and execution of a program in a computing environment, and more particularly, it relates to a method and system for locating and building source locations for program files that may be stored somewhere in a computing environment.

BACKGROUND OF THE INVENTION

A computer system can be configured to run a variety of different applications. In today's fast cycle world, it is increasingly common to configure a computer system to also run different versions of the same application. Application files typically are stored on storage media directly attached to the computer system, however, they can also be located on network attached storage media when operating in a networked, or distributed computer environment.

In a Graphical User Interface (GUI) environment, the information required to launch an application is normally captured and stored as an icon or a shortcut. Traditionally, the user launches a particular application by selecting the name of the shortcut and instructing the operating system to execute it. The application selection process includes reading and parsing a directory or file names by the user and knowledge of the installed software. The present invention provides a solution that allows a self learning algorithm to identify and correctly launch the requisite application with minimal user interface by the use of a caching technique.

On the other hand, a network computing architecture includes a distributed computing environment, which generally comprises one or more server computers, one or more client PC's and may include one or more mainframe hosts. All computers are linked to one another through a network, which may be a local area network (LAN) running on an ethernet link, or a wide area network (WAN). The hard disk drive of each computer coupled to the network stores files in their structures. These files may or may not be shared with other computers in the network depending upon the permission granted by the network administrator. Where a large number of computers participate in such networks, it is essential to automate as much of the processes involved in distributed computing as possible. The present invention solves one of those critical processes and involves automating the search for files distributed throughout the network.

SUMMARY OF THE INVENTION

An object of the present invention is to provide software developers with the capability to generically refer to any existing file located in a computer system.

Another object of the present invention is to provide software developers with the capability to generically refer to any existing file in a distributed environment, which may include one or more computers and multiple storage units.

An advantage of the present invention is that, due to its modular design, it can be incorporated into any program written in most of the current programming languages (e.g., C++ or Visual Basic).

Another advantage of the present invention is that software developers do not need to know a priori where a specific program physically resides in a distributed network.

The present invention is capable of referring to a specific program in a generic fashion.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which the drawings form a part of this application.

DETAILED DESCRIPTION OF ONE EMBODIMENT

Figure 1:
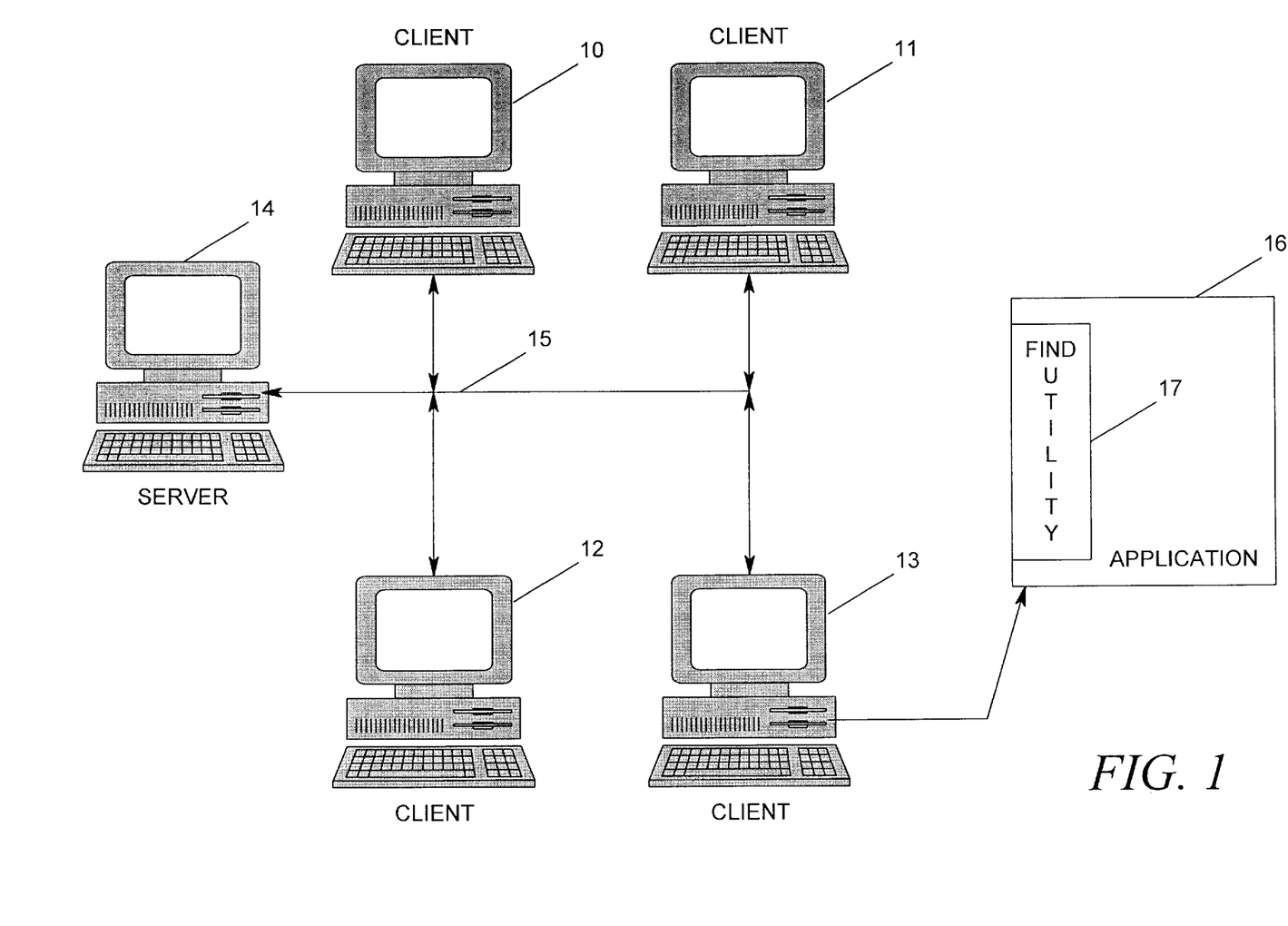
FIG. 1 is a block diagram of a computer system that may employ the present invention.

Referring now to FIG. 1, a block diagram of a system that may employ the present invention is shown. A multiplicity of clients 10 through 13 are coupled to a server 14 by means of a network 15, which may comprise a local area network (LAN) or a wide area network (WAN). Such networks are well-known in the art and will not be disclosed further herein. One of the clients, such as the client 13, is executing an application 16 that includes the find utility module 17 of the present invention. As alluded to hereinabove, the find utility program of the present invention locates and builds source locations (i.e., paths) for program files that may be present somewhere in a distributed computing environment. It is pointed out that the term computer system, as used herein, may include one or more computers. That is, the present invention may be useful in a multiple-computer system, but is not limited to such systems.

Figure 2:
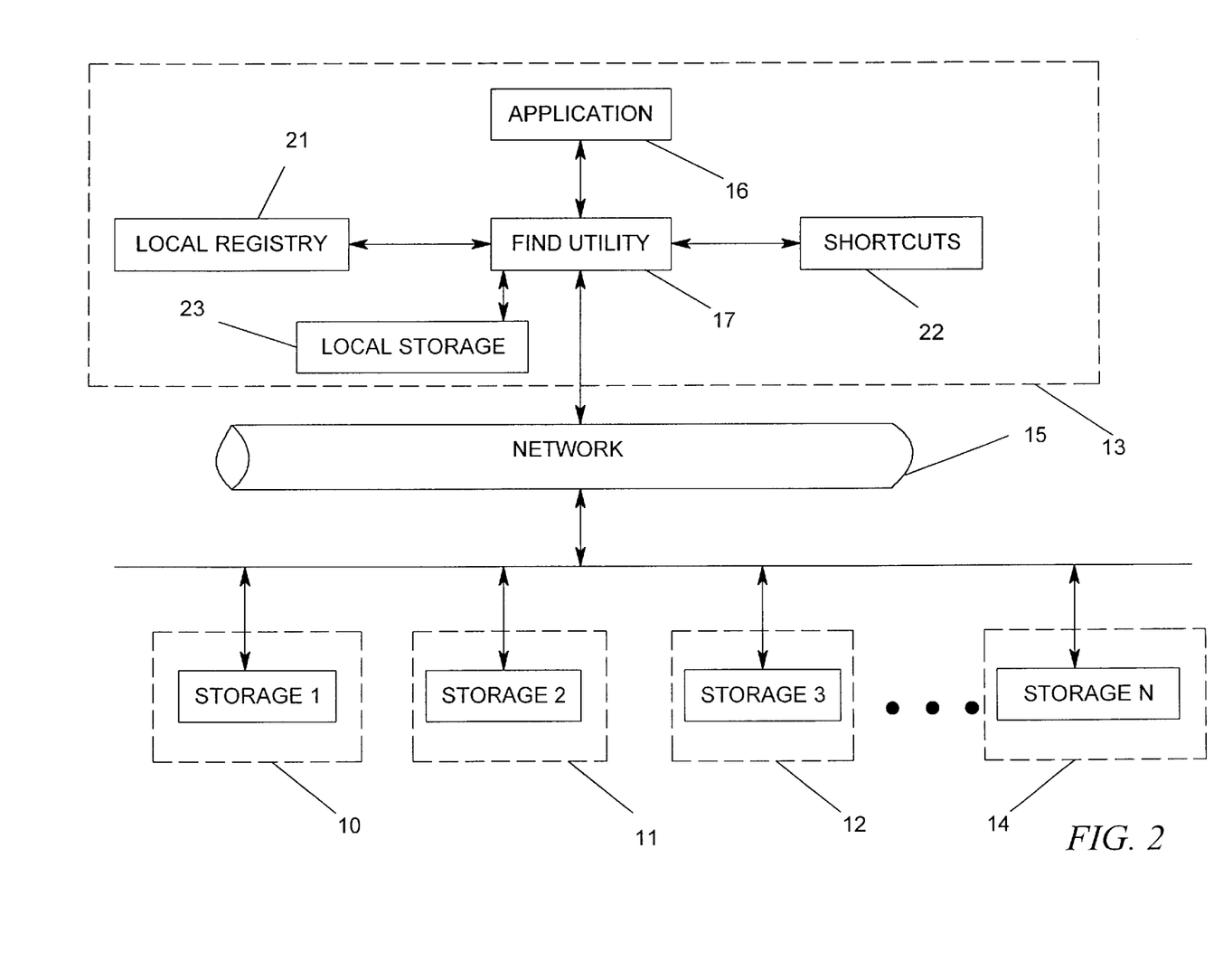
FIG. 2 is a software module block diagram of the present invention.

Referring now to FIG. 2, a software module block diagram of the present invention is shown. The find utility module 17 of the present invention is coupled to the network 15 in the same manner as described hereinabove. Also, within the client 13 is the application 16. The find utility program 17 also has access to a local registry 21, shortcuts 22 and a local storage 23. The local registry 21 is a file stored in the local storage for remembering where system information is kept, i.e., any information that any application wants to remember. The shortcuts 22 are a generic method for pointing somewhere else in the system. An example of a shortcut is an icon typically used with Windows software that points to another application (e.g., word processing).

Storage 1, which is disposed within the client 10, is accessible via the network 15. In a similar manner, storage 2 is disposed within the client 11; storage 3 is disposed within the client 12, and storage N is disposed within the server 14. The point to be made here is that the storage for each of the computers on the network is accessible via the network 15. This point will be more fully appreciated hereinbelow under the description of the process details. The find utility 17 can search not only the local storage 23 for a file, but it can also search the storage associated with each of the clients in the network. In accordance with the present invention, once the path to the sought for file is found, a shortcut to that file is stored in the local storage 23.

Figure 3A:
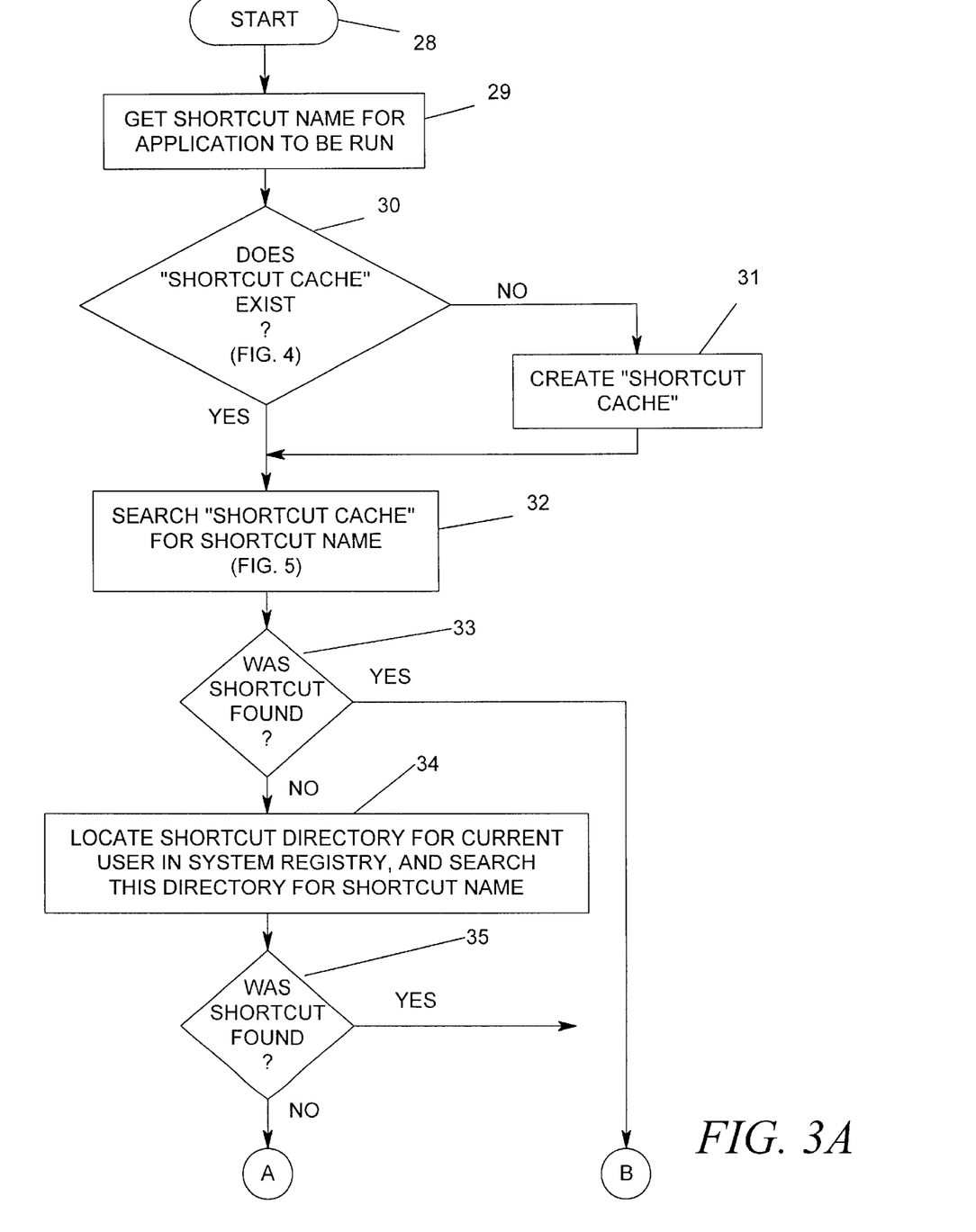
FIGS. 3A through 3C when combined form a flow chart of the method of the present invention.
Figure 3B:
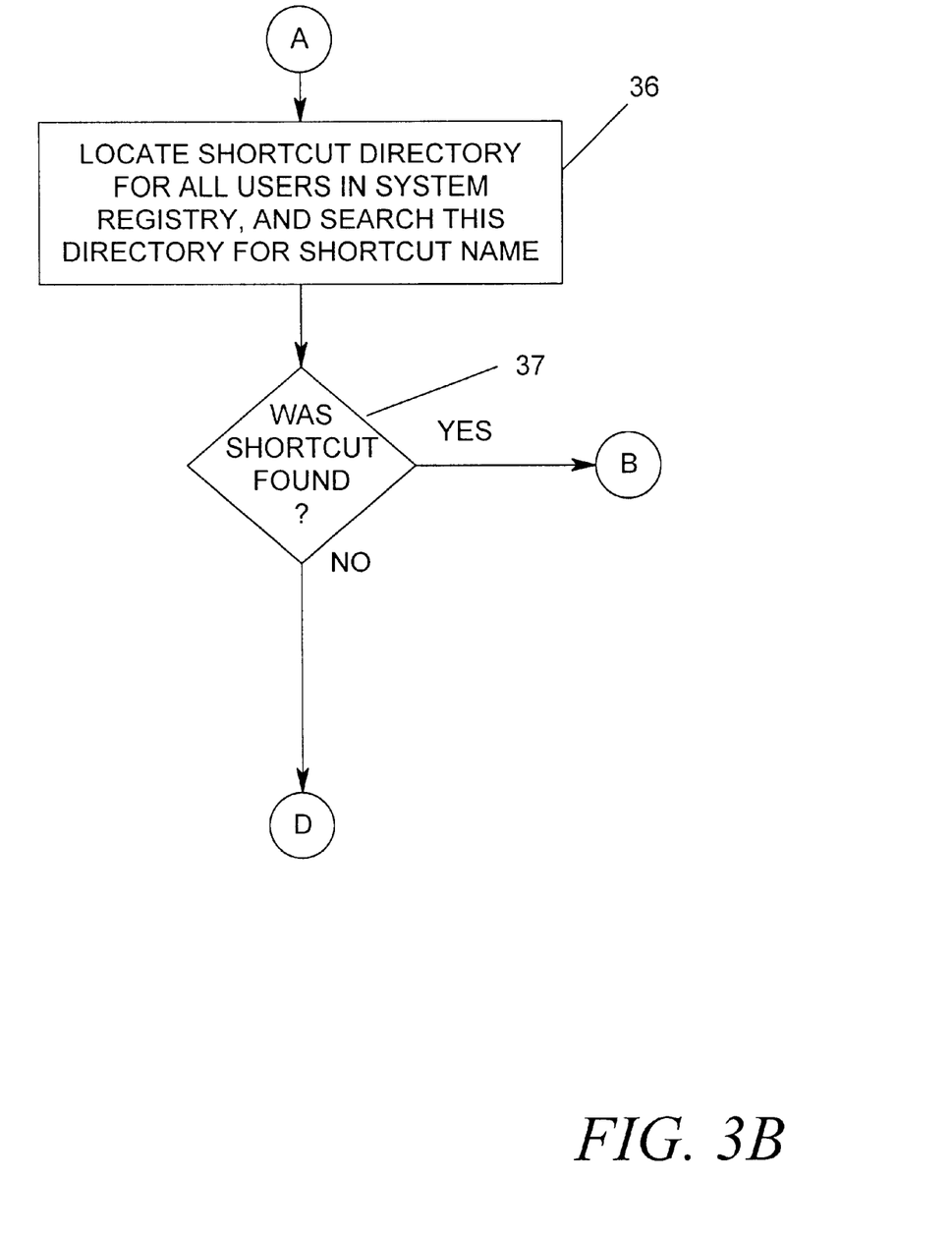
Figure 3C:
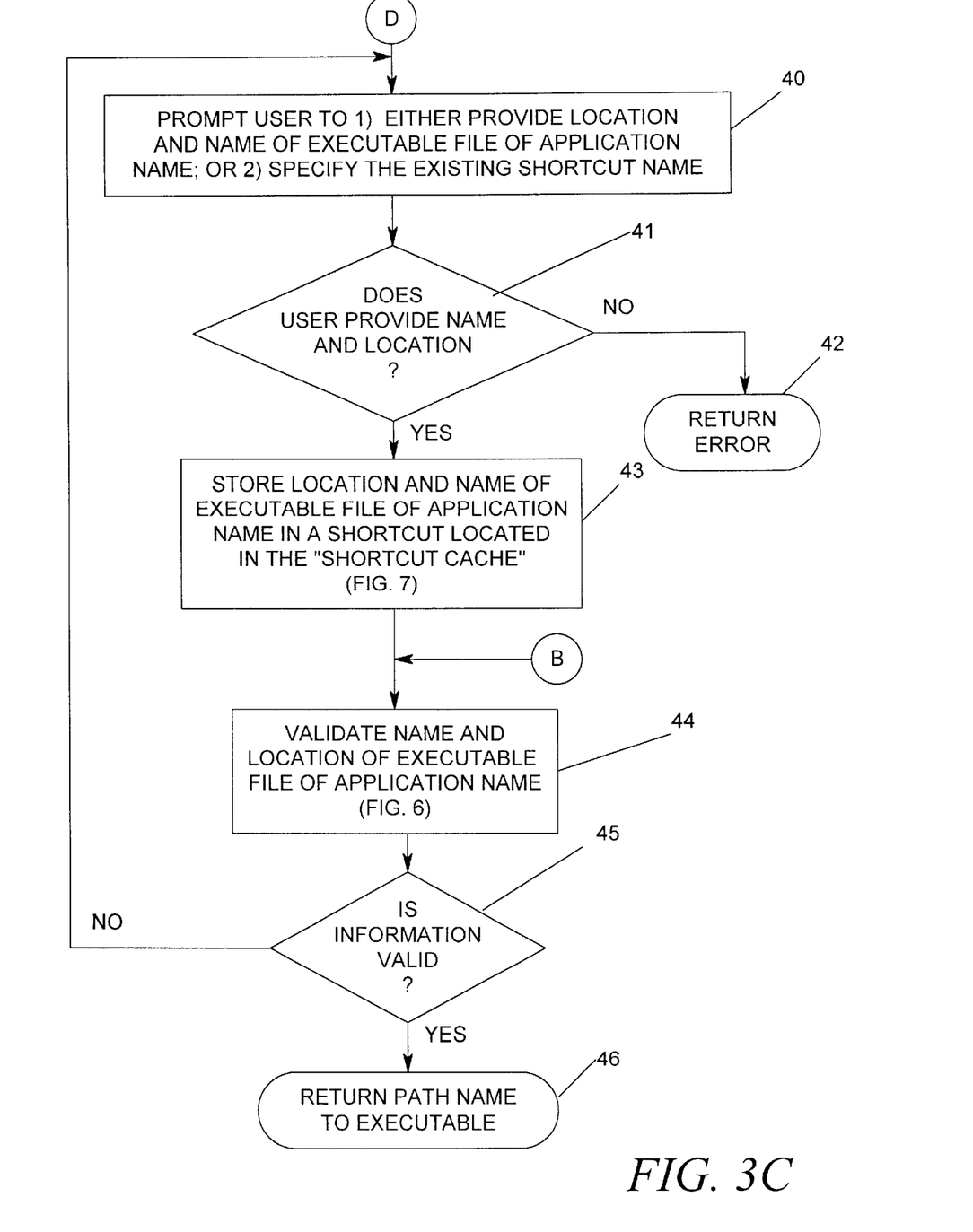
Figure 4:
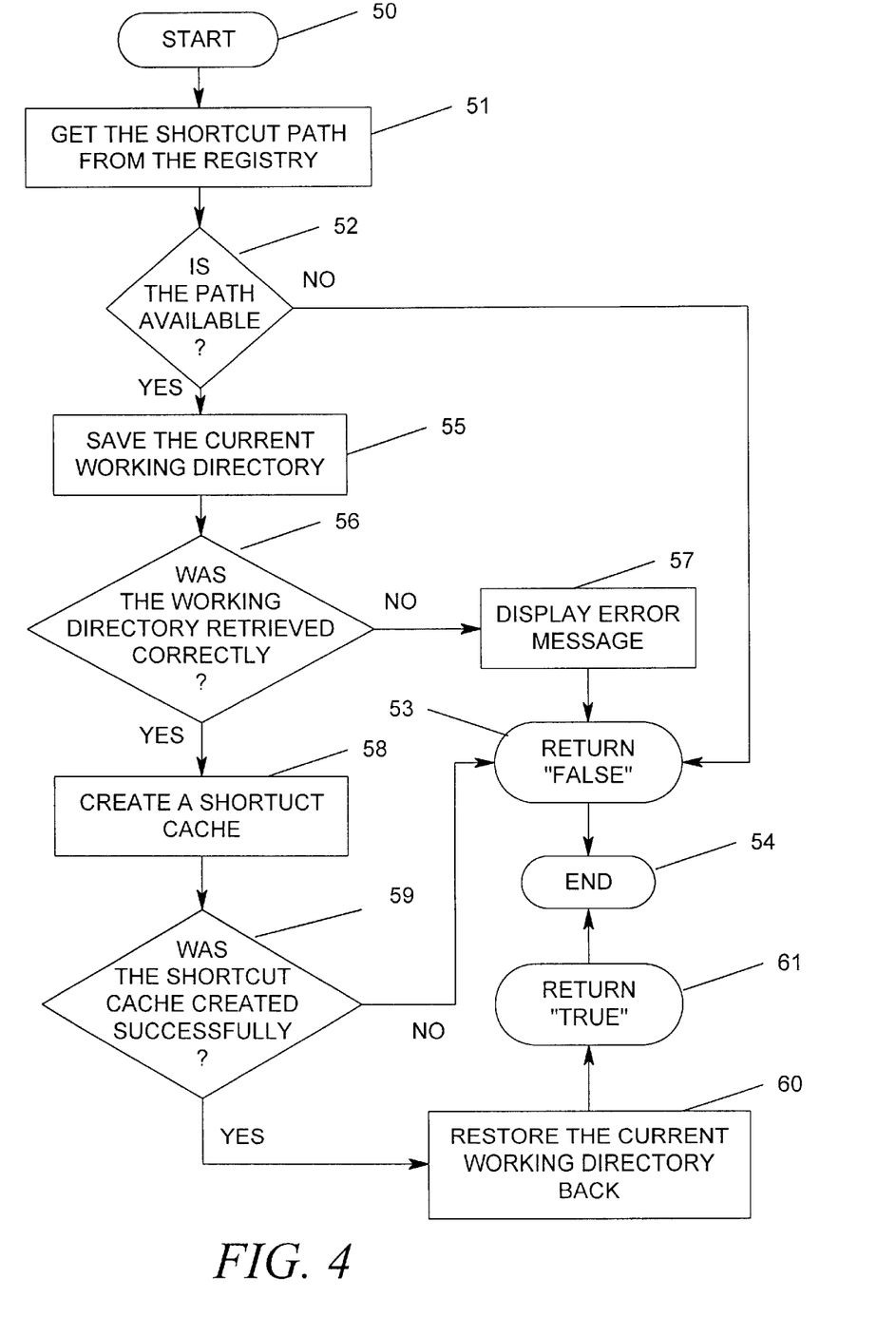
FIG. 4 is a flow chart of the process for verifying the existence of a shortcut directory.

Referring now to FIGS. 3A through 3C, a flow chart of the method of the present invention is shown. The process begins in FIG. 3A at a start bubble 28 followed by a process step (block 29) of getting the shortcut name for the application to be run. Next, an inquiry is made as to whether or not a shortcut cache exists (diamond 30). Details of this part of the process are illustrated in FIG. 4 and described further hereinafter.

Figure 5:
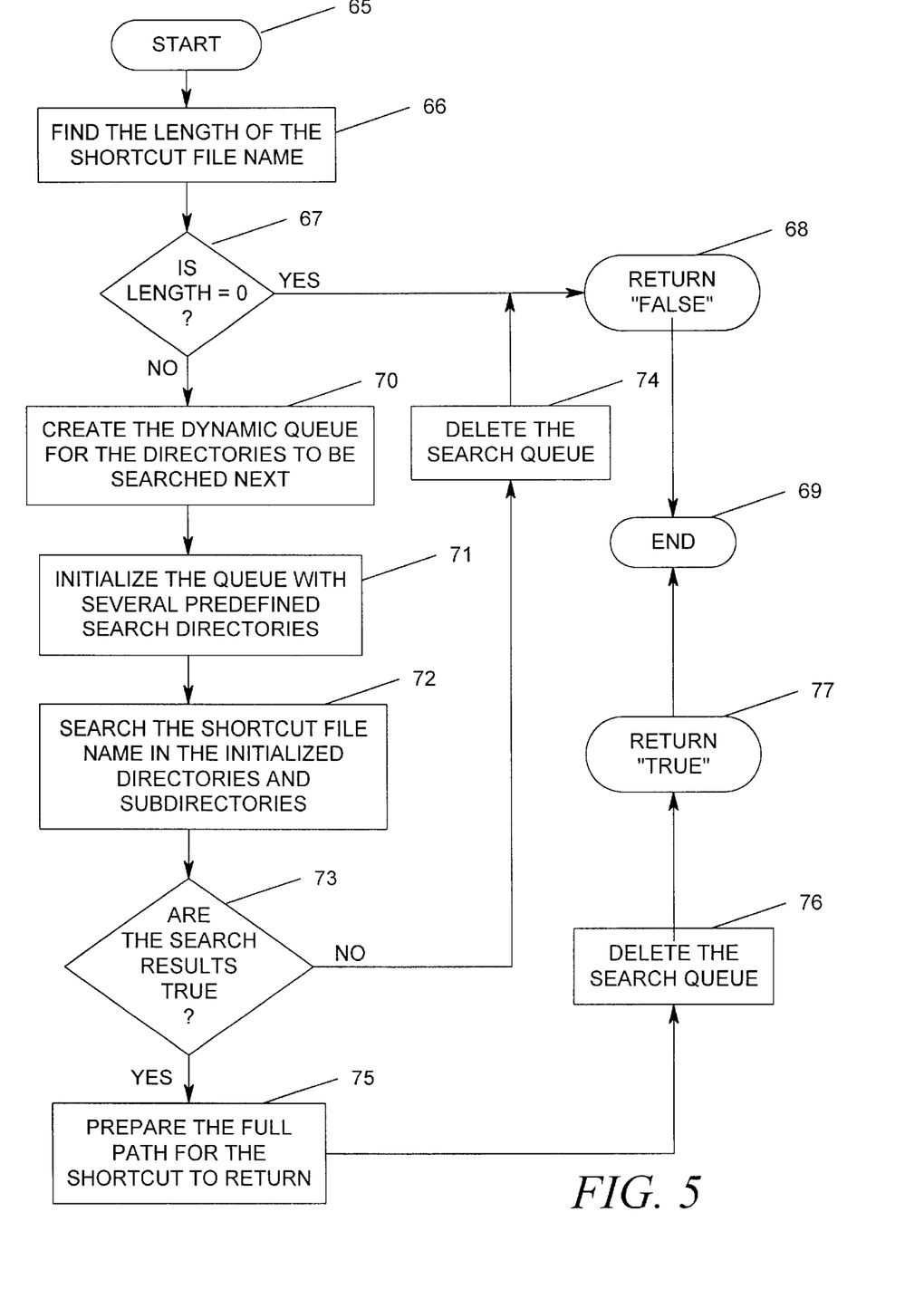
FIG. 5 is a flow chart of the process for searching the full path for the shell link file.

A shortcut cache as that term is used herein refers to a place where shortcut names are stored (e.g., a file in the local storage 23). If the answer to this inquiry is no, then a shortcut cache is created (block 31). After this, or if a shortcut cache already exists, then a search is made of the shortcut cache for a shortcut name (block 32). Details of the shortcut cache search are illustrated in FIG. 5 and amplified further hereinafter.

An inquiry is made as to whether or not the shortcut was found (diamond 33). If the answer to this inquiry is no, then the shortcut directory for the current user is located in the system directory and a search is made thereof for the shortcut name (block 34). After this, another inquiry is made as to whether or not the shortcut was found (diamond 35). If the answer to this inquiry is no, then the process illustration continues in FIG. 3B as denoted by a connector A.

Referring now to FIG. 3B at the connector A, the shortcut directory for all users is located in the system registry and a search is made thereof for the shortcut name (block 36). Details of this step are illustrated in FIG. 5 and amplified further hereinafter. Yet another inquiry is made as to whether or not the shortcut was found (diamond 37). If the answer to this inquiry is yes, then a branch is taken to a part of the process illustrated in FIG. 3C as denoted by a connector B. On the other hand, if the answer to this inquiry is no, then the process illustration continues in FIG. 3C as denoted by a connector D.

Referring now to FIG. 3C at the connector D, the user is prompted to either provide the location and name of the executable file or the application name, or specify an existing shortcut name (block 40). An inquiry is next made as to whether or not the user provides the name and location requested (diamond 41). If the user does not, then an error is returned (bubble 42). On the other hand, if the user does provide the requested name and location, then the location and name of the executable file of the application name are stored in a shortcut located in the shortcut cache (block 43). This step of the process is illustrated in more detail in FIG. 7 and amplified hereinafter. Following this, a validation is made (block 44). This step of the process is illustrated in detail in FIG. 6 and amplified hereinafter. Another inquiry is made as to whether or not the information provided is valid (diamond 45). If the answer to this inquiry is no, then a return is: made back to the process block 40 to prompt the user again.

If the user-provided information is valid (yes answer to the inquiry diamond 45), then the path name is returned to the executable (bubble 46). Returning briefly to FIG. 3A, at the diamond 37, if the shortcut is found on the first try, then a branch is made to the block 44 (FIG. 3C) to validate the name and location of the executable file, as denoted by a connector B. Again returning to FIG. 3A, if the answer to the inquiry in the diamond 33 or diamond 35 is yes and a short is found, then a branch is taken to the process block 44 for validation of the name and location of the executable file, as denoted by the connector B. Returning to, FIG. 3B briefly, if an alternate name is found (yes answer to the inquiry diamond 39 then a branch is taken back to the process block 32 in FIG. 3A for searching the shortcut cache.

Referring now to FIG. 4, a flow chart of the process for verifying the existence of a shortcut cache is shown. This part of the process verifies the existence of a shortcut cache for an application. If one is not there, then one is created. The process begins with a start bubble 50 followed by a process step of getting the shortcut path for the registry (block 51). An inquiry is next made as to whether or not this path is available (diamond 52). If the answer to this inquiry is no, then a return of "False" is made (bubble 53) and the process ends (bubble 54).

If the requested path is available, i.e., yes exit from the diamond 52, then the current working directory is saved (block 55). After this, an inquiry is made as to whether or not the working directory was retrieved correctly (diamond 56). If the answer to this inquiry is no, then an error message is displayed (block 57). On the other hand, if the working directory was retrieved correctly, then a shortcut cache is created (block 58). Next, an inquiry is made as to whether or not the shortcut cache was created successfully (diamond 59). If the answer to this inquiry is no, then a return of "false" is made (bubble 53) and the process ends (bubble 54).

If the shortcut cache was successfully created, i.e., yes leg from the diamond 59, then the current working directory is restored (block 60). After this, a return of "true" is made (bubble 61) and the process ends (bubble 54).

Referring now to FIG. 5, a flow chart of the process for searching for the system file representing the shortcut is shown. The process begins with a start (bubble 65) followed by a process step of finding the.

Referring now to FIG. 5, a flow chart of the process for searching for the system file representing the shortcut is shown. The process begins with a start bubble 65 followed by a process step of finding the length of the shortcut file name (block 66). Next, an inquiry is made as to whether or not the length is equal to zero (length=0, diamond 67). If the answer to this inquiry is yes, then a return of "false" is made (bubble 68) and the process ends (bubble 69).

If the length does not equal zero, i.e., no exit from the diamond 67, then the dynamic queue for the directories to be searched next is created (block 70). Next, the queue is initialized with several predefined search directories (block 71). Then a search is made for the shortcut file name in the initialized directories and sub-directories (block 72). After this, an inquiry is made as to whether or not the search results are true (diamond 73). If the answer to this inquiry is no, then the search queue is deleted (block 74), a return of false is made (bubble 68) and the process ends (bubble 69).

On the other hand, if the search results are true, i.e. yes exit from the diamond 73, then the: full path is prepared for the shortcut to return (block 75). Next, the search queue is deleted (block 76), a return of "true" is made (bubble 77) and the process ends (bubble 69).

Figure 6:
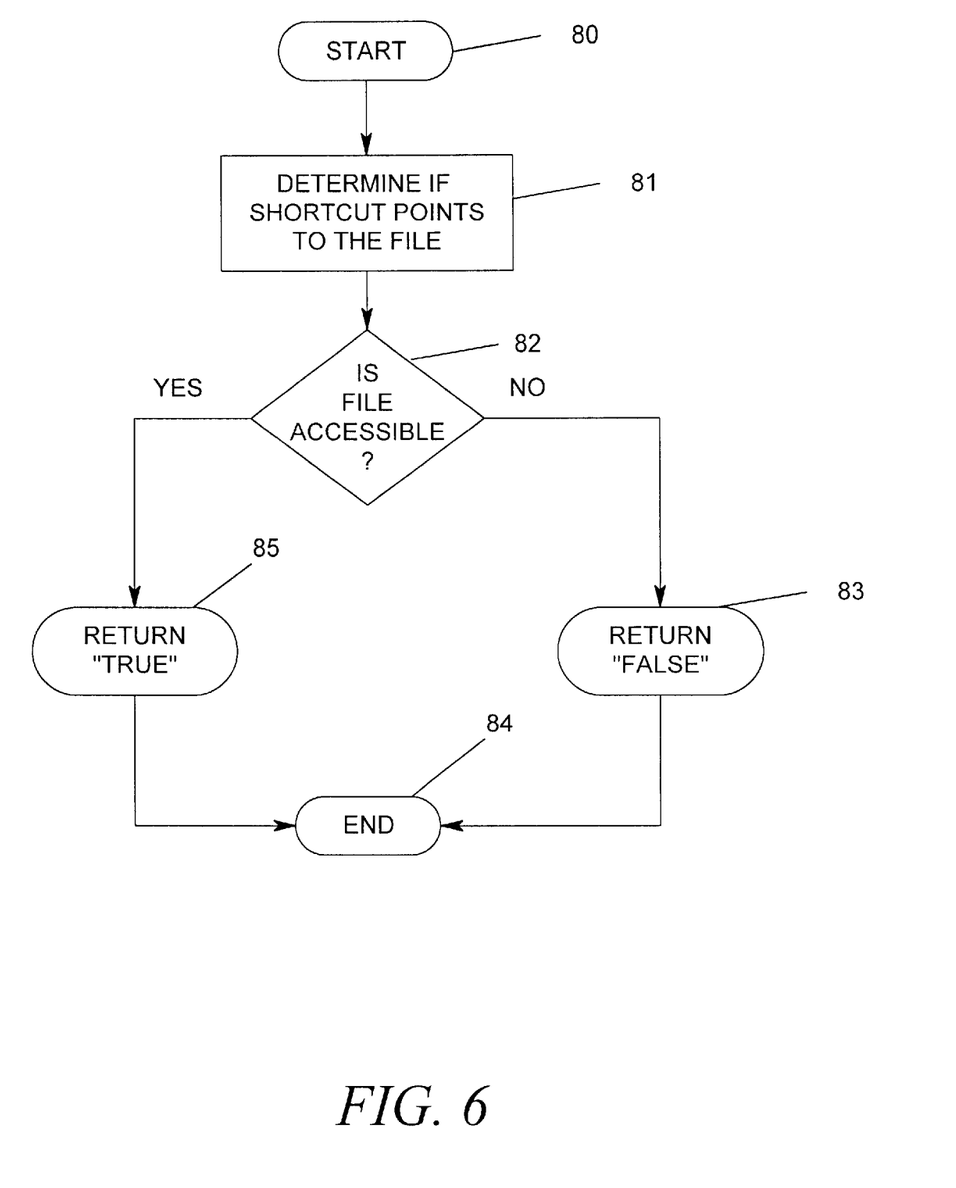
FIG. 6 is a flow chart of the process to verify if a file is available in the file system.

Referring now to FIG. 6, a flow chart of the process to verify if a file is available in the file system is shown. The process begins with a start bubble 80 followed by a process step of determining if the shortcut points to the file to be verified (block 81). Next, an inquiry is made as to whether or not the file is accessible (diamond 82). If the answer to this inquiry is no, then a return of "false" is made (bubble 83) and the process ends (bubble 84). On the other hand, if the file handle is valid, i.e., yes exit from the diamond 82, then a return of "true" is made (bubble 85) and the process ends (bubble 84).

Figure 7:
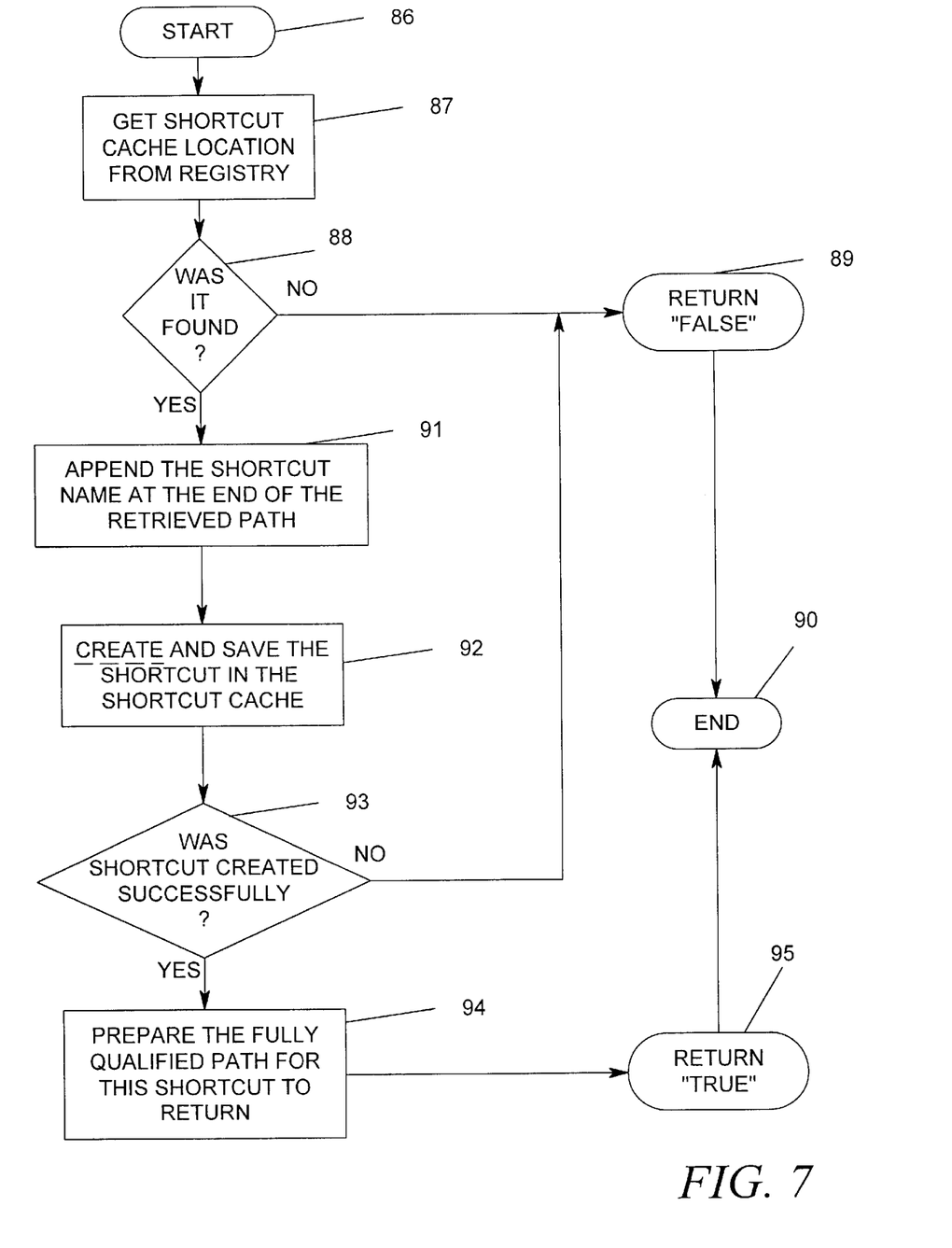
FIG. 7 is a flow chart of the process for creating a shortcut.

Referring now to FIG. 7, a flow chart of the process for creating a shortcut is shown. This part of the process creates a shortcut, i.e. a shell link for a particular object in the designated directory retrieved from the registry. The process begins with a start bubble 86 followed by a process step of getting the shortcut cache location from the registry (block 87). Next, an inquiry is made as to whether or not the location was found (diamond 88). If the answer to this inquiry is no, then a return of "false" is made (bubble 89) and the process ends (bubble 90).

If the shortcut cache location was found, i.e., the yes exit from the diamond 88, then the shortcut name is appended to the location (block 91). Next, the shortcut for the execution object passed in is created and saved in the shortcut cache (block 92). After this, an inquiry is made as to whether or not the shortcut was created successfully (diamond 93). If the answer to this inquiry is no, then a return of "false" is made (bubble 89) and the process ends (bubble 90). On the other hand, if the shortcut was successfully created, i.e., yes exit from the diamond 93, then the fully qualified path for this shortcut is prepared for return (block 94). Next, a return of "true" is made (bubble 95) and the process ends (bubble 90).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any, such modifications of embodiments that fall within the true scope of the invention.

What is claimed is:

1. In a distributed computer system having more than one computer connected through a network, a method for programmatically locating a remote file and building a shortcut for future reference to said remote file, said method comprising the steps of:
   a. creating a shortcut cache in a first computer in response to a request for said remote file if said shortcut cache does not exist;
   b. searching said shortcut cache in said first computer for a shortcut name for said remote file, and if not found;
   c. locating a shortcut directory for a current user in the system registry of said first computer, and searching said shortcut directory for said shortcut name, and if not found;
   d. locating a shortcut directory for all users in the system registry of said first computer, and searching said shortcut directory for said shortcut name, and if said shortcut is found;
   e. storing a shortcut containing data corresponding to location and name data of said remote file in said shortcut cache; and
   f. returning said location and name data of said remote file to the requestor;
   g. and if said shortcut name is not found in step d above, prompting the user of said first computer to provide location and name data for said remote file.

2. A method according to claim 1, including the step of storing a shortcut in said shortcut cache based on the location and name data provided by said user.

3. A method according to claims 1, wherein said remote file is an application program.

4. A storage medium encoded with machine-readable computer program code for programmatically locating any remote file and building a shortcut for future reference to said remote file, wherein, when the computer program is executed in a distributed computer system having more than one computer connected through a network, the computer program performs the steps of:
   a. creating a shortcut cache in a first computer in response to a request for said remote file if said shortcut cache does not exist;
   b. searching said shortcut cache in said first computer for a shortcut name for said remote file, and if not found;
   c. locating a shortcut directory for a current user in a system registry of said first computer, and searching said shortcut directory for said shortcut name, and if not found;
   d. locating a shortcut directory for all users in the system registry of said first computer, and searching said shortcut directory for said shortcut name, and if said shortcut is found;
   e. storing a shortcut, containing data corresponding to location and name data of said remote file, in said shortcut cache; and
   f. returning said location and name data for said remote file to the requestor;
   g. and if said shortcut name is not found in step d above, prompting the user of said first computer to provide location and name data for said remote file.

5. A storage medium as in claim 4 including the step of storing a shortcut in said shortcut cache based on the location and name data provided by said user.

6. A storage medium as in claim 4, wherein said remote file is an application program.

\* \* \* \* \*